Nov. 14, 1950  E. EVANS  2,530,050
SIGNALING DEVICE FOR FISHING LINES
Filed March 22, 1948
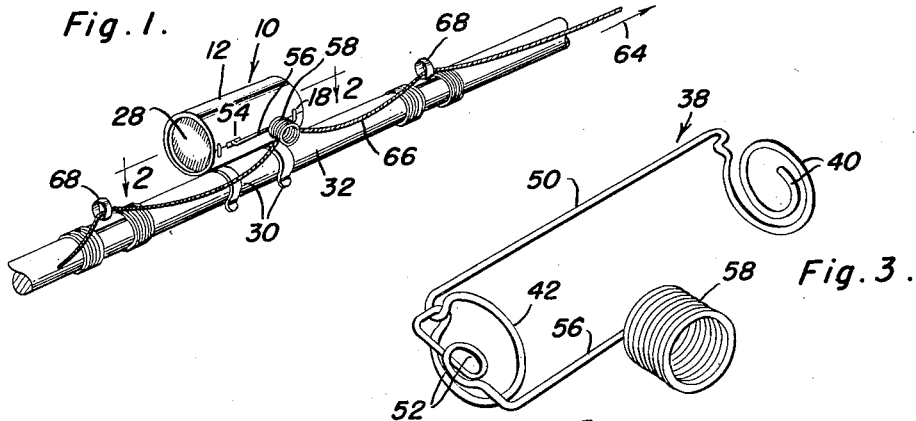
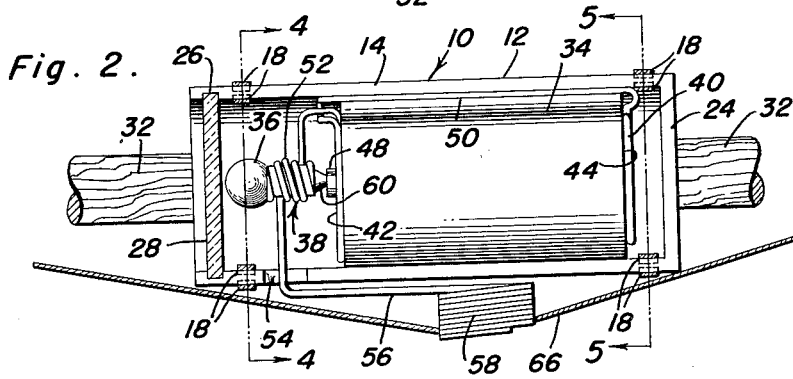
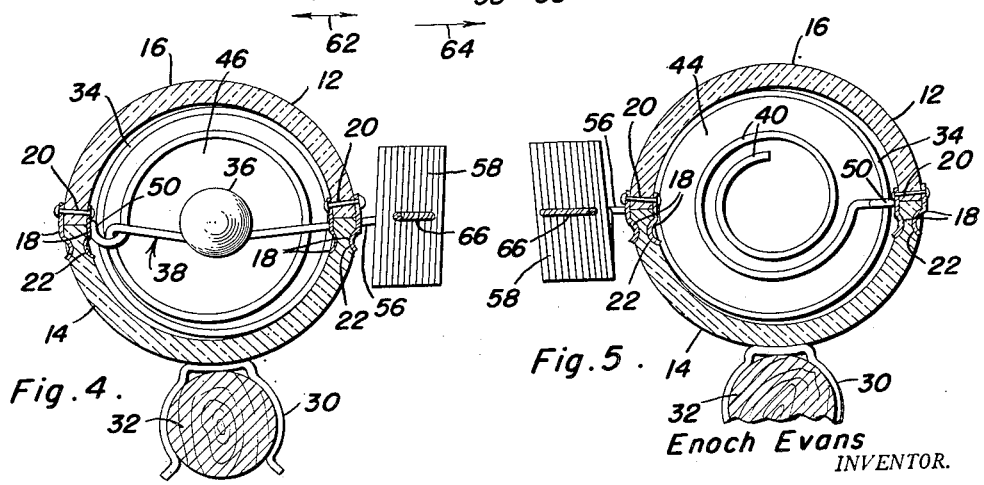
Enoch Evans
INVENTOR.

UNITED STATES PATENT OFFICE 2,530,050

SIGNALING DEVICE FOR FISHING LINES

Enoch Evans, Great Bend, Kans.

Application March 22, 1948, Serial No. 16,287

1 Claim. (Cl. 43—17)

This invention relates to new and useful improvements and structural refinements in signalling devices, more specifically, signalling devices for fishing lines, and the principal object of the invention is to visibly indicate to the fisherman that a fish is pulling on the line.

This object is achieved by the provision of a signalling device which includes an electric battery and a bulb, matters being so arranged that the bulb is brought in contact with and energized by the battery when the fishing line is pulled.

Moreover, the invention contemplates the provision of a bulb holder formed integrally from one piece of material, this holder being in an open electrical circuit with the battery and also engaging the fishing line, so that when the line is pulled, the bulb is brought in contact with the battery and the electrical circuit is thereby completed.

Additionally, the invention involves the provision of a housing for the battery and bulb, the housing being formed with an elongated opening through which the aforementioned holder may movably extend to engage the fishing line.

An important feature of the invention lies in its adaptability for use at night, since energization of the electric bulb will visually indicate when the fish bites.

Another feature of the invention resides in the provision of a signalling device which may be quickly and easily applied to or removed from a fishing rod.

An additional feature of the invention lies in the provision of a signalling device which is simple in construction, convenient and dependable in operation, and which will not easily become damaged.

With the above more important objects and features in view, and such other objects and features as may become apparent as this specification proceeds, the invention consists essentially of the arrangement and construction of parts as illustrated in the accompanying drawings, in which:

Figure 1 is a perspective view of the invention in situ on a fishing rod;

Figure 2 is a longitudinal cross sectional view, taken substantially in the plane of the line 2—2 in Figure 1;

Figure 3 is a perspective view of a holder used in the invention;

Figure 4 is a cross sectional view, taken substantially in the plane of the line 4—4 in Figure 2; and, Figure 5 is a cross sectional view, taken substantially in the plane of the line 5—5 in Figure 2.

Like characters of reference are employed to designate like parts in the specification and throughout the several views.

Referring now to the accompanying drawings in detail, the invention consists of a signalling device designated generally by the reference character 10, the same embodying in its construction a substantially cylindrical housing 12 consisting of a pair of complementary half-sections 14, 16. The half-sections 14, 16 are separably connected together by means of suitable clips 18, the latter being mounted by rivets, or the like, 20 on one half-section and releasably engaging suitable depressions 22 provided in the other half-section, as is best shown in Figures 4 and 5.

The half sections 14, 16 are provided at one end with semi-circular end wall portions 24, while the other end portions of the half-sections are grooved to provide an annular recess 26 in which a circular lens 28 may be positioned.

If desired, one of the half-sections (14) of the housing 12 may be provided with a pair of resilient clips 30, whereby the entire signalling device may be removably mounted upon a conventional fishing rod 32.

A dry battery 34 of conventional type is removably positioned in the housing 12, this being accomplished by separating the half-sections 14, 16 of the housing, as will be clearly understood.

A bulb 36 is also disposed within the housing 12 adjacent the lens 28, the bulb being supported by means of a holder 38 which will be presently described.

The holder 38 is formed integrally from one piece of resilient, wire rod, one end portion of which is coiled in a spiral fashion so as to provide a pad 40, while an intermediate portion of the rod is similarly coiled to form a loop-like pad 42. The pad 40 is intended to engage the usual, metallic end 44 of the battery 34, while the pad 42 similarly engages the relatively opposite end 46 of the battery, surrounding the terminal 48 of the latter, as will be clearly apparent.

It should be understood that the inside diameter of the housing 12 is somewhat greater than the outside diameter of the battery 34, so that a space exists between the battery and the housing, through which space a portion 50 (between the pads 40, 42) of the holder 38 may extend.

Moreover, the rod from which the holder 38 is formed is coiled to provide a helical socket, so to speak, 52 for the base of the aforementioned bulb 36, whereupon the rod passes outwardly from the housing 12 through an opening 54 formed in one of the half-sections (14) and is angulated to provide a limb 56 which extends externally and longitudinally of the housing. The arm or limb 56 terminates in a helix 58, the purpose of which will be hereinafter more fully explained. It should be also mentioned at this point that the socket 52 and the bulb 36 are disposed immediately adjacent the terminal 48 of the battery 34, but the resiliency of the holder 38 is such that the contact boss 60 of the bulb is normally disengaged from the terminal 48. However, the opening or recess 54 is elongated sufficiently to facilitate movement of the limb 56 and of the socket 52 in the directions of the arrows 62, so that the contact boss 60 of the bulb 36 is readily engageable with the terminal 48 when the helix 58 is moved in the direction of the arrow 64.

It should be also explained that the pads 40, 42 of the holder 38 frictionally engage the ends 44, 46 respectively of the battery 34 so that the battery is firmly and removably held in the holder. Moreover, since the opening 54 is formed in one of the longitudinal edges of the housing half-section 14, the battery together with the entire holder may be readily removed from the housing by simply separating the housing half-sections. Needless to say, in addition to its purpose of engaging the battery 34, the pad 40 is in electrical contact with the metallic end 44 of the battery, so that when the socket 52 is moved in the direction of the arrow 64 and the boss 60 of the bulb 36 is brought in engagement with the terminal 48, the bulb 36 will be energized by the battery, as will be clearly apparent.

The usual fishing line 66 passes through suitable loops 68 provided on the fishing rod 32, and when the invention is placed in use, the housing 12 is applied to the fishing rod by means of the clamps or clips 30, whereupon the fishing line 66 is inserted between a pair of coils of the helix 58, so that when the line is pulled in the direction of the arrow 64, the bulb 36 will be brought in contact with the terminal 48 of the battery 34, thereby energizing the bulb and indicating to the fisherman that a fish is biting on the line. Needless to say, the bulb 36 may be readily observed through the lens 28, directed toward the fisherman.

It should be also noted that when the line 66 is windable upon a reel (not shown) the line, although being frictionally engageable with the coils of the helix 58 so as to actuate the device, will, nevertheless, be permitted to slide through the helix while it is being wound onto the reel.

While in the foregoing there has been shown and described the preferred embodiment of this invention it is to be understood that minor changes in the details of construction, combination and arrangement of parts may be resorted to without departing from the spirit and scope of the invention as claimed.

Having described the invention, what is claimed as new is:

In a signalling device, the combination of a battery, a bulb and a combined battery holder, bulb socket and actuator comprising a single piece of wire providing a straight stem extending longitudinally at a side of said battery, one end portion of said wire being in the form of a flat spiral disposed at one end of and in a plane perpendicular to said stem and affording a holder member engageable with one end of said battery, an intermediate portion of said wire being in the form of a substantially circular loop disposed at the other end of and in a plane perpendicular to said stem and affording a coacting holder member engageable with the other end of the battery, a further intermediate portion of said wire constituting a helical bulb socket having its axis parallel to said stem and movable toward and away from said coacting holder member, and a continuation of the socket forming portion of the wire affording a substantially L-shaped actuating arm extending longitudinally at a side of said battery and terminating in a helix constituted by the other end portion of said wire, said helix having its axis perpendicular to said stem and being adapted to receive and frictionally engage an actuating line between the coils thereof, whereby the bulb in said socket may be operatively engaged with the battery in the holder by movement of said helix in a direction parallel to said stem.

ENOCH EVANS.

REFERENCES CITED

The following references are of record in the file of this patent:

UNITED STATES PATENTS

| Number | Name | Date |
|---|---|---|
| 1,858,026 | Schulte et al. | May 10, 1932 |
| 2,070,755 | Seigle et al. | Feb. 16, 1937 |
| 2,088,201 | Goertzen | July 27, 1937 |
| 2,166,657 | Evelyn | July 18, 1939 |
| 2,195,692 | Bushey | Apr. 2, 1940 |
| 2,262,040 | Pell | Nov. 11, 1941 |
| 2,299,467 | Colby | Oct. 20, 1942 |